US009038957B1

(12) United States Patent
Fork

(10) Patent No.: US 9,038,957 B1
(45) Date of Patent: May 26, 2015

(54) SYSTEMS AND METHODS FOR PROVIDING ENERGY TO SUPPORT MISSIONS IN NEAR EARTH SPACE

(75) Inventor: Richard Fork, Madison, AL (US)

(73) Assignee: The Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 481 days.

(21) Appl. No.: 13/349,393

(22) Filed: Jan. 12, 2012

Related U.S. Application Data

(60) Provisional application No. 61/432,061, filed on Jan. 12, 2011, provisional application No. 61/513,344, filed on Jul. 29, 2011.

(51) Int. Cl.
*B64G 1/10* (2006.01)

(52) U.S. Cl.
CPC ........................................ *B64G 1/10* (2013.01)

(58) Field of Classification Search
USPC .................. 320/101; 244/158.4, 172.7, 158.1
See application file for complete search history.

(56) References Cited

U.S. PATENT DOCUMENTS

| 3,535,543 | A | * | 10/1970 | Dailey | 307/149 |
| 3,781,647 | A | * | 12/1973 | Glaser | 322/2 R |
| 4,318,517 | A | * | 3/1982 | Salkeld et al. | 244/158.2 |
| 6,492,940 | B2 | * | 12/2002 | Mikami et al. | 342/354 |
| 6,534,705 | B2 | * | 3/2003 | Berrios et al. | 136/243 |
| 6,936,760 | B2 | * | 8/2005 | Rogers et al. | 136/246 |
| 8,074,936 | B2 | * | 12/2011 | Criswell | 244/172.7 |
| 8,653,784 | B2 | * | 2/2014 | Bland | 320/101 |
| 2001/0035207 | A1 | * | 11/2001 | Mikami et al. | 136/292 |
| 2005/0109879 | A1 | * | 5/2005 | Patterson | 244/172 |
| 2009/0230250 | A1 | * | 9/2009 | Wehner et al. | 244/172.7 |
| 2011/0058248 | A1 | * | 3/2011 | Vodopyanov et al. | 359/330 |
| 2011/0156498 | A1 | * | 6/2011 | Criswell | 307/149 |
| 2013/0032673 | A1 | * | 2/2013 | Kobayashi | 244/158.4 |

* cited by examiner

*Primary Examiner* — Christopher P Ellis
(74) *Attorney, Agent, or Firm* — Maynard Cooper & Gale, P.C.; Jon E. Holland

(57) ABSTRACT

A system has a plurality of spacecraft in orbit around the earth for collecting energy from the Sun in space, using stimulated emission to configure that energy as well defined states of the optical field and delivering that energy efficiently throughout the region of space surrounding Earth.

1 Claim, 6 Drawing Sheets

SYSTEMS AND METHODS FOR PROVIDING ENERGY TO SUPPORT MISSIONS IN NEAR EARTH SPACE

CROSS REFERENCE TO RELATED APPLICATIONS

This application claims priority to U.S. Provisional Patent Application No. 61/432,061, entitled "Planetary Defense and an Energy Infrastructure for Near Earth Space" and filed on Jan. 12, 2011, which is incorporated herein by reference. This disclosure application also claims priority to U.S. Provisional Patent Application No. 61/513,344, entitled "Quantum Energy for Space" and filed on Jul. 29, 2011, which is incorporated herein by reference.

STATEMENT REGARDING FEDERALLY SPONSORED RESEARCH OR DEVELOPMENT

This invention was made with Government support under NASA Contract NNC08BA08B. The Government has certain rights in the invention.

FIELD OF THE DISCLOSURE

This disclosure pertains to the field of laser/optical systems and technology supportive of collection of energy from a source, such as our Sun, or batteries, etc., and conversion of that energy to coherent light, combined with distribution of energy over the long distances of space for efficient generation of propulsive thrust, electrical energy and related applications.

RELATED ART

To reduce costs for space missions, there is a desire to develop spacecraft capable of taking of and landing like similar airplanes as opposed to the rocket-based approaches that have been used in the past, such as with the space shuttle and the Saturn V rockets. However, it takes a significant amount of power to thrust a spacecraft from the earth's surface to outer space, and providing a spacecraft designed for normal take-offs with sufficient fuel for generating the required power is problematic.

DETAILED DESCRIPTION

The present disclosure generally pertains to systems for collecting energy from the Sun in space, using stimulated emission to configure that energy as well defined states of the optical field and deliver that energy efficiently throughout the region of space surrounding Earth. Having optical energy in these forms that approximate particular superposition states of lowest order Gaussian modes of optical energy formed as regards spatial, temporal, and frequency distributions in the near vacuum of space enables efficient transmission of that energy over the multi-megameter distances of near Earth space. In addition these forms of distribution can be managed so as to enable a properly equipped receiver of the energy to use currently realizable optics to efficiently receive and efficiently reconfigure the energy to form valuable and useful distributions of the transmitted energy in space, time, and/or frequency, with a specificity and precision approaching the maximum degree of precision consistent the laws of quantum phenomena. This same technique is also applicable to a similar energy infrastructure located on virtually any star and planetary system similar to our Sun and Earth, e.g., an exoplanet.

The disclosure offers multiple options not available using classical phenomena, including the ability to collect energy from our Sun and deliver it efficiently over the long distances of space in forms that are near the optimum allowed by physical laws for efficient conversion of the transmitted energy to propulsive thrust, electrical power and other valuable applications requiring energy. This is essentially a paradigm change as regards the acquisition, distribution and use of energy in space from a classically based approach to an approach based on optical quantum phenomena. This disclosure addresses the portion of such a system for managing the acquisition and distribution of energy in space.

Figure 1:
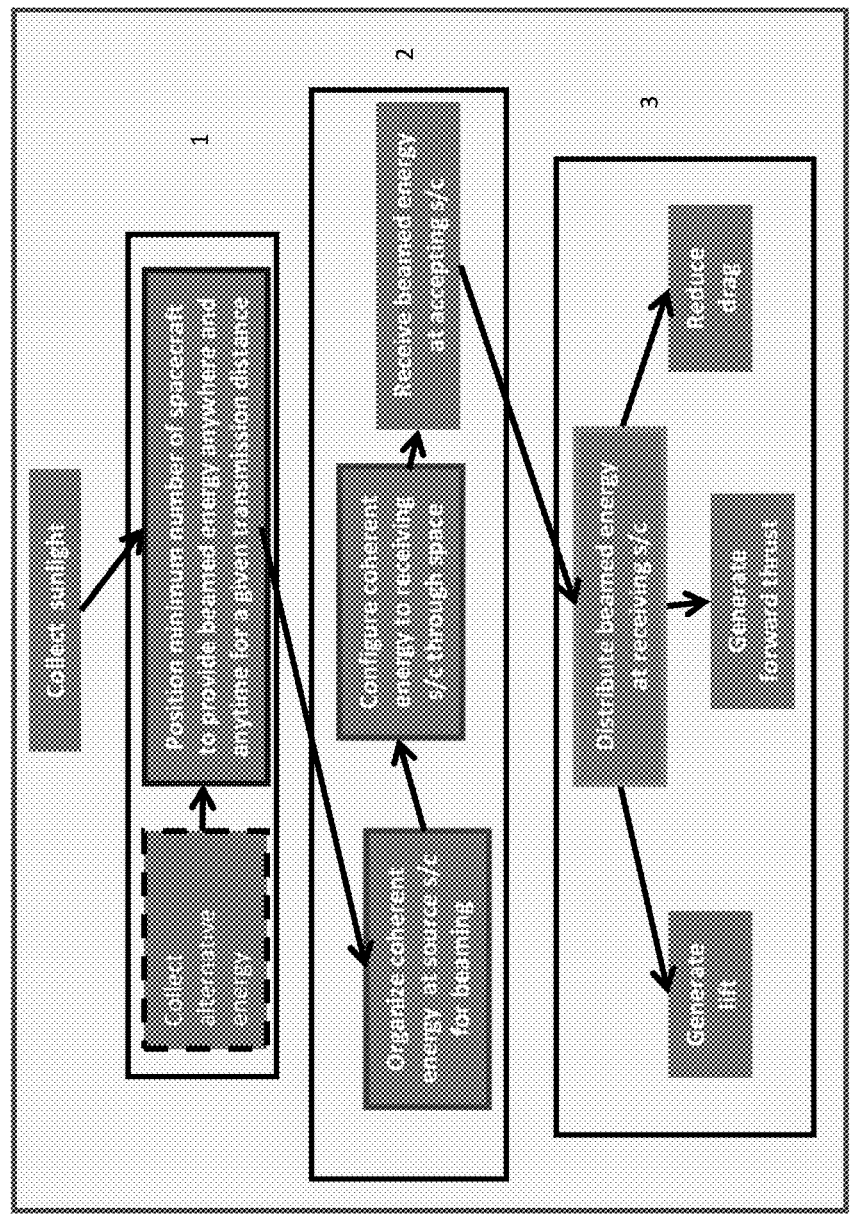
FIG. 1 is a flowchart illustrating an exemplary process of providing energy to support missions in near earth space.

FIG. 1 depicts a process for providing energy from quantum phenomena based energy infrastructure for near Earth space, or a similar planet orbiting a star similar to our Sun. This disclosure relates to the design and specific properties of the system of spacecraft that will collect energy convert that energy to energy configured largely as coherent optical fields useful for distribution in space and then distribute that energy as coherent light in the space served by the energy infrastructure. This space, for the case of Earth, extends in one exemplary embodiment from the upper edge of the troposphere to a radial distance from the surface of earth limited principally by the particular distribution of spacecraft used and the range of the optical systems carried on the spacecraft. A region extending out to 12 Mm from the surface of Earth could be a region served by an early stage infrastructure.

Delivery of energy from the configuration of spacecraft supporting this infrastructure to the surface of Earth through the upper atmosphere is an option, weather permitting. However, many of the quantum phenomena based capabilities tend to be rapidly compromised during propagation through the atmosphere of Earth regardless of weather conditions. Thus, we focus attention primarily on the region from the upper edge of the troposphere to locations further from the surface of Earth. To some extent the quantum phenomena of interest can be accessed by preparation of the beamed energy in advance of the beaming event. This is a complex task which we do not attempt to address in this disclosure.

Issues Inherent to a Space Based Energy Infrastructure

A problem in providing such infrastructures is that it is not practical in space to provide fixed networks, such as used for energy and information distribution in our terrestrial environment. In general, the sources of energy and information and also the receivers of energy and information will be in a variety of different orbits traveling with a variety of different velocities in different directions.

There is consequently a need for systems that can continuously collect and distribute both energy and information, preferably in ways that are safe, reliable, involve minimum delay, and can be implemented at reasonable cost. A practical concern is that of providing the basic features of an energy or information infrastructure, in particular meeting the goal of reliably providing the needed energy or information with minimum delay, anytime and anywhere in the region served.

A system in accordance with the present disclosure comprises a means for deriving energy from a source, such as our Sun or a reserve supply of energy on a spacecraft, and: (1) Configuring that energy in a form that enables efficient transmission and reception of that energy over distances typical of near Earth space. We consider near Earth space to mean the entire three dimensional volume extending roughly from the upper edge of our troposphere to geostationary orbit. (2) Deliver the energy configured for delivery in space, typically as lowest order Gaussian modes of free space, in forms that enable use of that energy at the receiving location as regards distribution in space, time, and frequency to maximum advantage as permitted by the laws of quantum phenomena. This is intended to enable, e.g.,: (1) Concentration of the transmitted light at the receiving site to energy densities adequate, e.g., for highly efficient conversion to propulsive thrust (as by ablation of material) or electrical energy (as by use of nearly monochromatic light and optimally matched photovoltaic material); (2) Initiating nuclear fusion as for a spacecraft engine to the degree allowed by the current state of work on optically initiated nuclear fusion; (3) Spatial distribution of the energy to be converted to propulsive thrust so as to support emerging novel propulsion capabilities and novel means of managing dissipation of heat (to be addressed in topics 2 and 3 of FIG. 1); and (4) Other novel means of utilizing the high average and high peak energies enabled by coherent light in the quantities and forms made possible by this acquisition and delivery method.

A goal of the current disclosure is, given the strategy of using lowest order Gaussian beams of optical frequency light, design optimal configurations formed of multiple spacecraft that will optimize the delivery system. Key goals are: (1) Minimize the number of spacecraft required, (2) Minimize the distance of the spacecraft from the surface of Earth; and (3) Position the spacecraft so that they will always continuously receive sunlight (in the absence of an eclipse); (4) Identify the family of configurations if the number of spacecraft is allowed to vary so as to minimize the distance of the spacecraft from Earth for a given number of spacecraft. The systems are to always provide at least one spacecraft that can deliver energy anywhere and anytime on the surface of Earth. Here the surface of Earth is regarded as the equivalent to the upper edge of the troposphere for the purpose of these design calculations.

In general, forms of energy, e.g., coherent light, which enable use of the energy in ways that approach the limits set by quantum phenomena do not lend themselves to distribution and use in regions where such distribution would be useful. There are a few notable exceptions. Our internet, e.g., utilizes optical quantum phenomena to generate lowest order Gaussian modes in single mode optical fiber. This provides a means of accessing high data rate transmission of information over long distances. This technology has had major impact as regards transmission of information, as e.g. our Internet. This means of transmitting information cannot be usefully adapted to transmission of energy in our terrestrial environment because optical fiber cannot tolerate the required energies and intensities. Also transmission in free space is not practical because of our atmosphere and safety issues.

Transmission of substantial energy by optical means in the near vacuum of space, however, is possible, and we suggest here, achievable with a high level of safety over virtually all of near Earth space. We further suggest that transmission of energy in forms and quantities throughout near Earth space is also possible in ways that will enable a cost effective energy infrastructure in near Earth space and other similar locations in the long term. The option of not only transmitting significant energy, but of transmitting that energy as superpositions of quantum states, such as the lowest order Gaussian mode of free space (the free space analog of the optical mode transmitted on single mode optical fiber for our Internet), creates options for an energy infrastructure offering capabilities not typically accessible in our terrestrial environment.

Not only does this strategy offer a means of delivering energy efficiently in substantial quantity with high precision in space and time over the multi-megameter distances of space, but the delivered energy can be provided in a form that facilities concentration and use of the energy in space, time, and frequency range to degrees that can closely approach the limits on energy density in space time and frequency set by the fundamental laws of physics. This is typically not an option in our terrestrial environment, except in highly controlled and closely managed laboratory settings.

We have identified a family of spacecraft configurations for distributing optical energy in forms that support such use of such optical quantum states. The lowest order Gaussian mode, essentially the same optical mode as used in single mode optical fiber communication systems, can also be used to major advantage to transmit both information and power over the long distances of near Earth space with optimum efficiency and precision.

Potential applications are: (1) Distributing both energy and information efficiently, safely, and precisely over the long multi-megameter distances of interest in space, e.g., gigabits of information and megawatts of power; (2) providing that information and energy in forms that facilitate a close approach to the optimum possible rates of use of information and energy in space, time and frequency at the receiving location.

Figure 2:
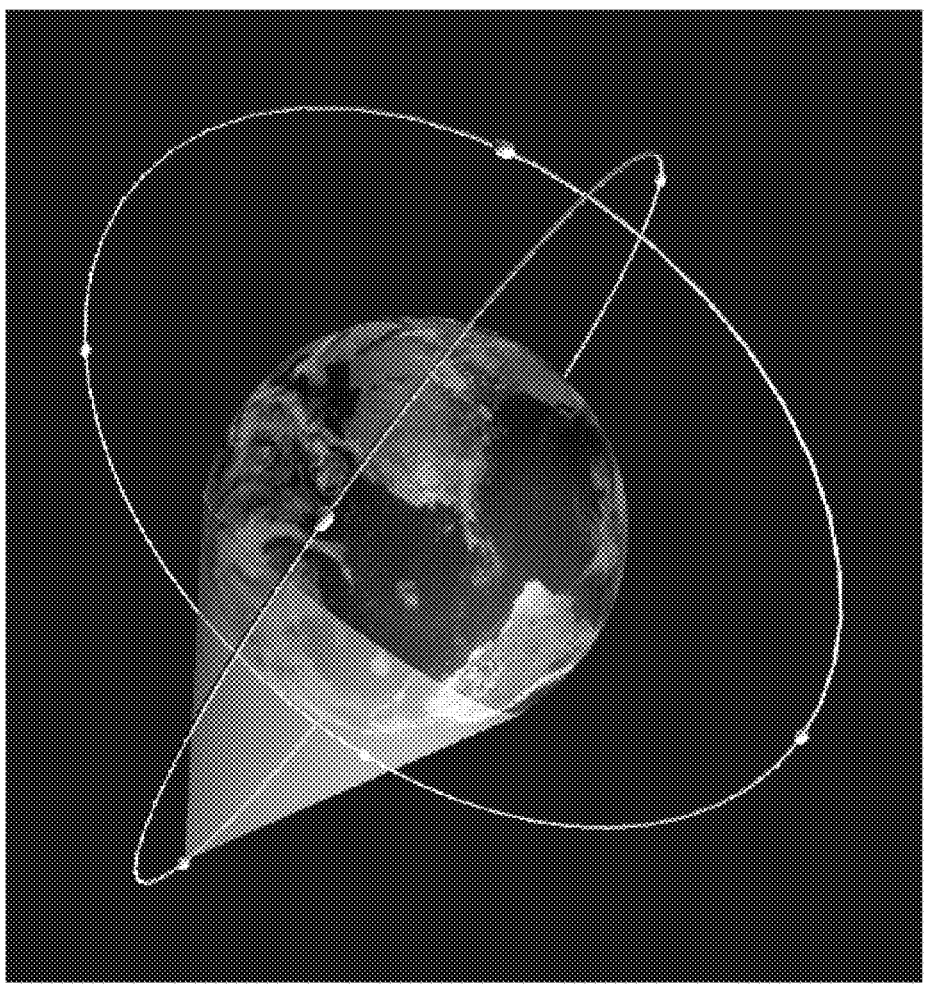
FIG. 2 depicts and exemplary configuration of eight spacecraft, e.g., designed to receive sunlight, convert that sunlight to coherent light and distribute the resulting energy anywhere and anytime as needed in near Earth space. The minimum distance of the spacecraft from the surface of Earth for this configuration of eight spacecraft happens to be approximately equal to the radius of Earth.

Referring to FIG. 2, the set of spacecraft configurations offer optimal means of delivering energy in space while minimizing the radial distance of the spacecraft from Earth for a given number of spacecraft. This addresses, e.g., the task of identifying configurations useful for supporting horizontal lift to orbit where energy must be supplied to spacecraft ascending near the upper edge of Earth's atmosphere. We assume that the goal of these infrastructures is direct transmission of the energy or information of interest at the speed of light in vacuum over line of sight paths from transmitting spacecraft to a receiving spacecraft or other receiver of the energy or information typically located near the upper edge of Earth['s atmosphere or in low Earth orbit.

Additional distribution paths can be identified by utilizing reflecting systems, such as mirror based optics, that redirect transmitted beams from a given spacecraft, or similar resource, to secondary, or tertiary, etc., systems located on additional spacecraft or resources. In this manner a single source of energy or information could distribute either energy or information anywhere and anytime in the region served. This, of course, introduces the additional complication of maintaining the reliability and efficiency of a more complex and typically time varying path.

The value of these systems we discuss is that they identify means of providing either or both, energy and/or information infrastructures that offer relatively simple configurations of spacecraft. The number of required spacecraft is relatively small and the delivery paths are sufficiently short so as to allow the use of optical systems that are of current practical interest. For example, for the case illustrated in FIG. 2, the transmission distance is of the order of 6 Mm from the spacecraft to the surface of Earth. This permits the use of beams having radii at the beam waist of the order of 1 m for light of one micron wavelength. Shorter optical wavelengths allow proportionally smaller beam radii.

We show in FIG. 2 the region accessed near the surface of Earth from one spacecraft in an optimal configuration of eight spacecraft. At least one of the eight spacecraft can beam energy, or information, at high delivery rates directly at the speed of light to any location in near Earth space. The regions of Earth's surface accessed by the rays transmitted to Earth from one of the spacecraft are illustrated (white conically shaped region). Similar, but different areas of the surface of Earth are accessed by the other seven spacecraft so as to provide complete coverage of the surface of Earth. The transmission from any of the spacecraft can also be directed away from Earth so as to reach regions of space further away from Earth as far as the optical systems on the spacecraft permit. Access to regions at least 6 Mm away will be possible for a beam waist of one meter and a wavelength of transmitted light of one micron. The distance away from Earth accessed increases as the square of the beam waist of the transmitted light. That is, a beam having a two meter waist could access distances of 24 Mm from the spacecraft, and so forth.

Figure 3:
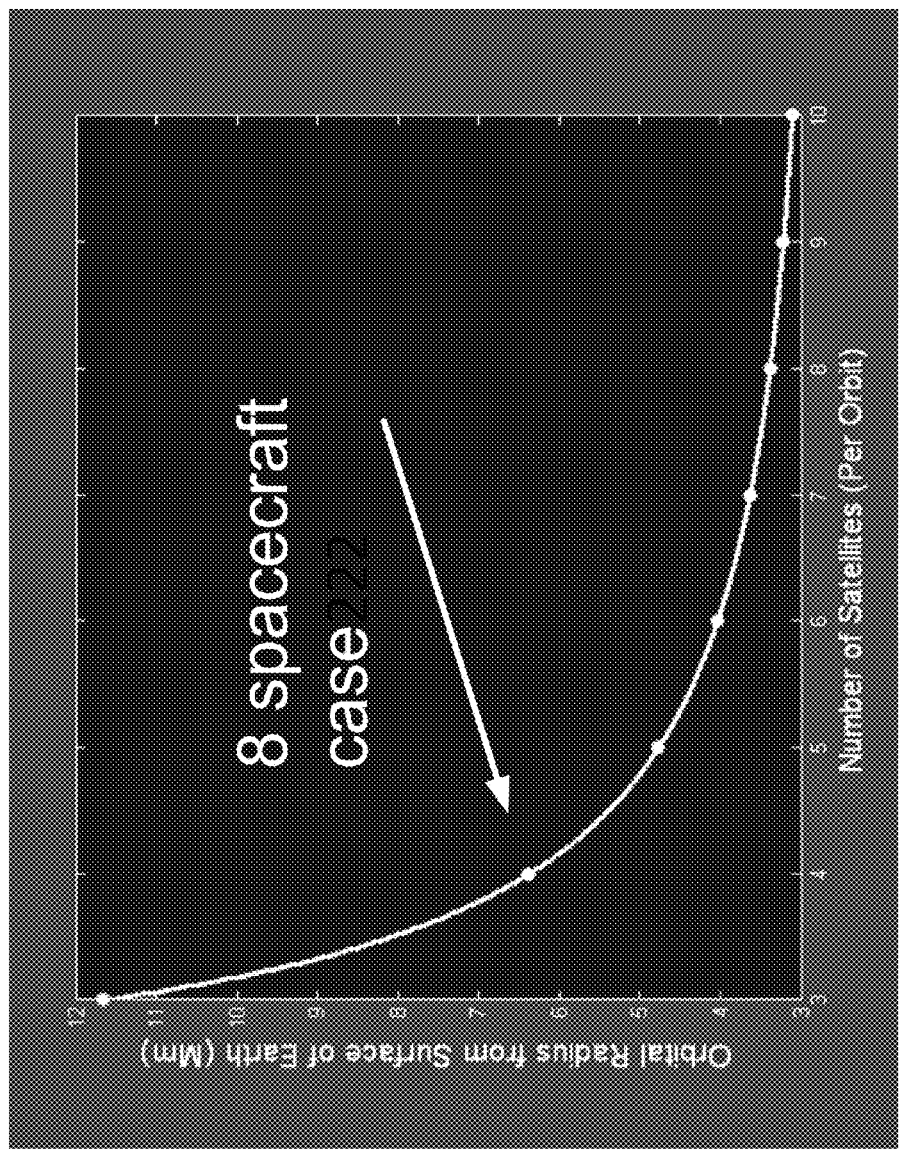
FIG. 3 depicts minimum radial distance from the surface of Earth vs. number N of spacecraft per orbit.

We show in FIG. 3 a plot of the minimum number of spacecraft required for a given radial distance from the surface of Earth to providing delivery of energy "anywhere and anytime" by distribution of coherent light. The smallest radial distance of the spacecraft from the center of a planet of radius $R_p$ for N spacecraft is approximately given by $R_o \geq R_p \sqrt{2}/\cos(\pi/N)$. The spacecraft collecting energy from the sun and redistributing that energy as coherent light are assumed to be equally distributed in two approximately orthogonal planes with orbits synchronized to allow complete coverage of the spatial region surrounding the planet while otherwise minimizing $R_o$.

The relative timing of the two groups of N spacecraft in the two approximately orthogonal planes can be varied to find a minimum value of the radial distance from the surface of the planet correspondingly to a slightly closer approach to the planet than given by the above expression. While there are patterns to the strategy that minimizes that approach distance for a given set of N spacecraft a computer program is required to identify the minimum approach distance for a given value of N.

Figure 4:
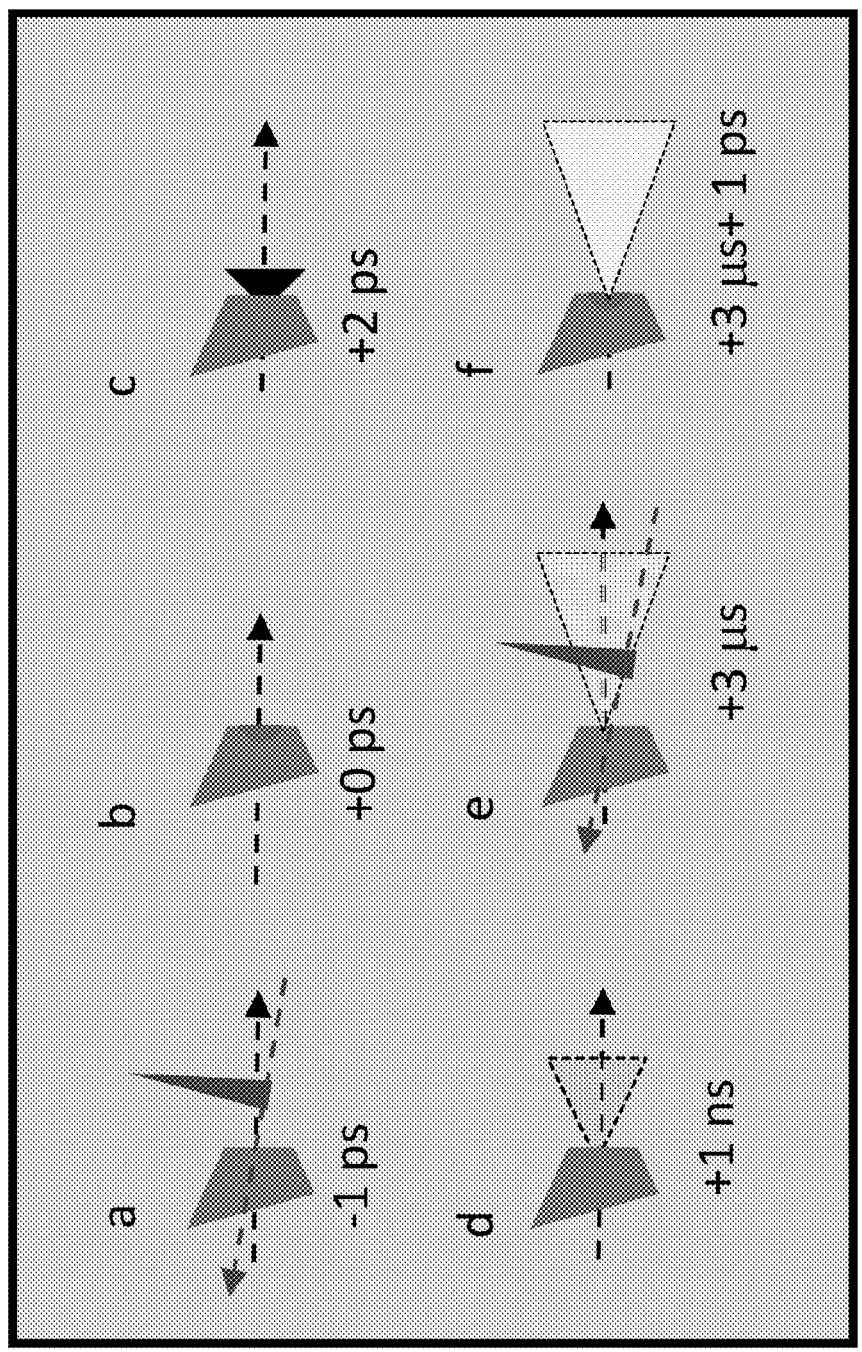
FIG. 4 illustrates a potential use of beamed coherent light.

Referring to FIG. 4, concentration of beamed energy in specifically designed train of ultrashort pulses beamed as lowest order Gaussian mode illustrates advantages of the capability to concentrate optical energy in minimum temporal and minimum spatial regions. The deorbiting impulse is delivered as a sequence of ultrashort optical pulses. The pulses are sufficiently short (a,b,c) that the incident pulse (a) is largely absorbed by the debris element (b) before the emission of the obscuring ejecta (c). The continuing obscuration (d) is avoided by not transmitting the next pulse which will exert a further deorbiting force until the time (e) when the ejected material has become largely transparent. This next pulse then begins the cycle again (f). This process (a-f) is repeated until the required deorbiting impulse has been exerted on the debris element. An IAC paper(s) addressing this strategy is (are) attached.

Figure 5:
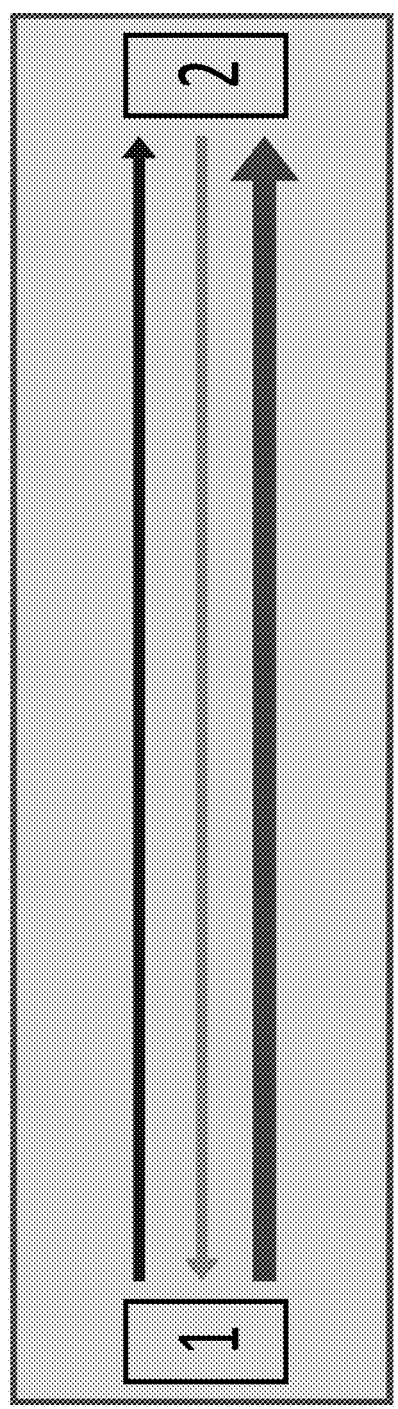
FIG. 5 depicts an exemplary power transmission sequence between two spacecraft.

Referring to FIG. 5, as a safety feature before beaming significant power (top) from spacecraft 1 to spacecraft 2 a low power "probe" signal beam (top) is transmitted to spacecraft 2 from spacecraft 1. Spacecraft 2 responds with a low power return beam (middle) which may be derived from the original (top) probe beam or originated at spacecraft 2.

Only on establishing that the "link" identified by the low power "probe" (top) beam and low power "verification of link" (middle) beam is securely established and maintained is the high power (bottom) beam transmitted. The transmission of the probe and verification beams is continue throughout the transmission of the power beam to insure that the link to being maintained. A noticeable decrement in the successfully transmitted power beam without a corresponding decrease in the transmitted power is also used to verify that the high power beam is being successfully transmitted between the two spacecraft and confined principally to those two spacecraft. Accordingly, the present disclosure describes systems for delivering energy to spacecraft in near Earth space from Earth.

Figure 6:
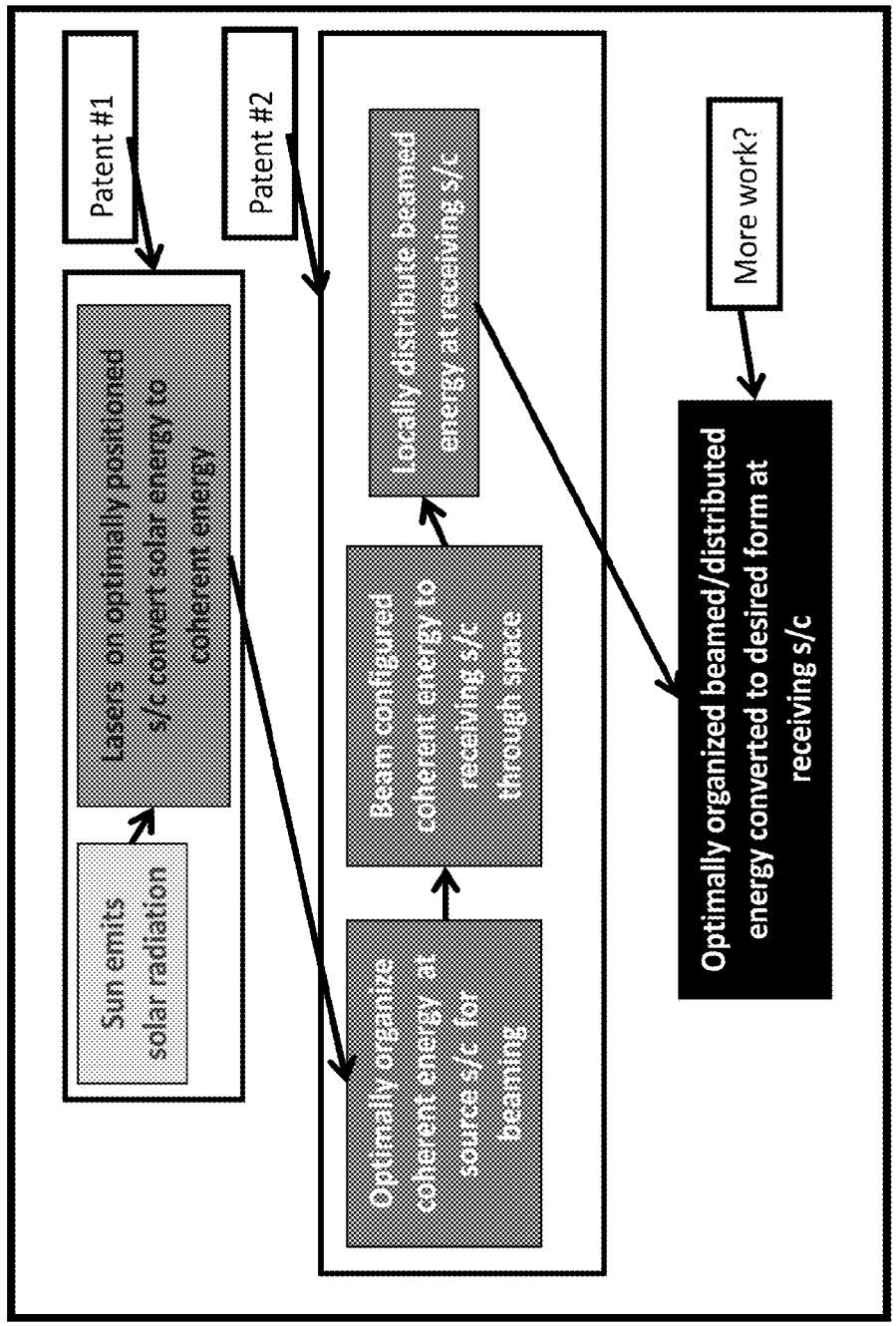
FIG. 6 is a flowchart illustrating an exemplary energy infrastructure in space.

Referring to FIG. 6, energy is derived from a source in space, such as our Sun, converting that energy to coherent light and then distributing that energy anywhere and anytime as needed in the vicinity of interest. For this example consider the space extending from roughly geostationary orbit to the upper edge of the troposphere (~16 km above the surface of Earth). Energy can be transmitted to the surface of earth; however, such transmission may be compromised by weather and will also be limited by the presence of Earth's atmosphere, especially for high average energy and/or ultrashort pulses above a relatively low energy, e.g., millijoule energies and higher and picosecond and shorter durations.

Block 1: Acquisition of conventional energy, conversion to energy in the form of high coherence light, location of spacecraft and equipping of spacecraft with optical systems designed so as to efficiently distribute energy as coherent light in near Earth space.

A design consideration is positioning a small number of spacecraft to collect energy, convert that energy to coherent light, and use that coherent light to energy anywhere and anytime needed. The region accessed extends approximately from the upper edge of the troposphere to as far from the surface of Earth as the optical systems allow. For eight spacecraft a region from the troposphere to approximately 12 Mm from the surface of Earth appears accessible.

Our preliminary study indicates that the number of spacecraft: (1) needed to acquire and distribute energy anywhere and anytime can be sufficiently small, e.g. eight; (2) the required optics adequately within current capabilities, e.g., 6 m aperture; (3) the accessed energy sufficiently large, e.g., a megajoule per second and (4) the potential applications valuable enough, e.g., an ability to deorbit small debris at useful removal rates, to recommend initiating design of an energy infrastructure for near Earth space.

Conversion of low coherence energy to high coherence energy: The upper block addresses the task of using energy from a conventional source of energy (low coherence energy such as sunlight) to generate energy in the form of coherent light (such as lowest order Gaussian modes of free space). The source of low coherence energy could be sunlight accessed in space or energy provided by some other means, such as, a nuclear reactor, photovoltaics, or batteries, chemicals, or reaction wheels.

Dimension of optics: A finding is that the transmission distances of interest, e.g., 6 Mm from FIG. 1 are comparable to the transmission distances possible using currently achievable optics. For example, the beam waist for a lowest order Gaussian beam is $w_o \approx \sqrt{\lambda L/2\pi}$ where is $\lambda$ is the optical wavelength of the transmitted light and L is the transmission distance. For a useful wavelength of interest $\lambda=10^6$ m the distance for eight spacecraft from the surface of Earth for our desired spacecraft configuration is about 6 Mm which requires $w_o=1$m. This in turn calls for an optical transmitting aperture at the transmitting location of about 6 m. This is order of the aperture dimension of current telescopes being developed for use in space, such as the James Webb telescope.

A second parameter is the magnitude of the energy that can be usefully delivered per unit time. Appendices A and B describe various embodiments of the present disclosure.

The invention claimed is:

1. A system for providing energy to support missions in near earth space comprising:
- a plurality of spacecraft orbiting the earth, each of the spacecraft configured to convert sunlight into energy and to transmit light pulses derived from the energy, the spacecraft positioned such that the plurality of spacecraft can transmit pulses derived from the energy to any point in near earth space.

* * * * *